United States Patent
Kim

(10) Patent No.: US 7,355,532 B2
(45) Date of Patent: Apr. 8, 2008

(54) VOLTAGE LEVEL CODING SYSTEM AND METHOD

(75) Inventor: Jin-Hyun Kim, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 360 days.

(21) Appl. No.: 11/066,831

(22) Filed: Feb. 24, 2005

(65) Prior Publication Data

US 2005/0286642 A1    Dec. 29, 2005

(30) Foreign Application Priority Data

Jun. 24, 2004    (KR) ............... 10-2004-0047638

(51) Int. Cl.
*H03M 5/02*    (2006.01)
(52) U.S. Cl. ............... 341/56; 341/55; 341/58; 341/59; 341/95; 375/242; 375/264; 375/286; 375/288; 375/353
(58) Field of Classification Search .......... 341/55–56
See application file for complete search history.

(56) References Cited

U.S. PATENT DOCUMENTS

| | | | |
|---|---|---|---|
| 4,486,739 A * | 12/1984 | Franaszek et al. ........ 341/59 |
| 5,387,911 A | 2/1995 | Gleichert et al. | |
| 6,278,740 B1 * | 8/2001 | Nordyke ............... 375/257 |
| 6,538,584 B2 * | 3/2003 | Borkar et al. .......... 341/58 |
| 6,917,312 B2 * | 7/2005 | Bessios ............... 341/56 |
| 7,081,838 B2 * | 7/2006 | Høyer ............... 341/58 |
| 7,113,550 B2 * | 9/2006 | Stonecypher et al. ..... 375/288 |
| 7,142,612 B2 * | 11/2006 | Horowitz et al. ....... 375/286 |
| 7,180,957 B2 * | 2/2007 | Bessios et al. ......... 375/286 |
| 7,180,958 B2 * | 2/2007 | Bessios et al. ......... 375/286 |
| 7,180,959 B2 * | 2/2007 | Bessios et al. ......... 375/286 |
| 7,184,483 B2 * | 2/2007 | Rajan ............... 375/244 |
| 2003/0108134 A1 * | 6/2003 | Stonick et al. ......... 375/353 |
| 2004/0196165 A1 * | 10/2004 | Lund et al. ............ 341/58 |
| 2005/0147178 A1 * | 7/2005 | Kikuchi ............. 375/288 |

OTHER PUBLICATIONS

A. X. Widmer and P.A. Franaszek "A DC-Balanced, Partitioned-Block, 8B/10B Transmission Code" IBM J. Res. Develop, vol. 27 No. 5 Sep. 1983. pp. 440-451.

* cited by examiner

*Primary Examiner*—Khai M. Nguyen
(74) *Attorney, Agent, or Firm*—Marger Johnson & McCollom, P.C.

(57) ABSTRACT

We describe a voltage level coding system and method. The voltage level coding system includes a level encoder having an input to receive data segments coded using a first code and an output to supply second data codes indicating one of $2^N$ plus at least one additional voltage level to which each data segment is assigned. A converter converts the second data codes into such voltage levels. A controller output supplies the voltage levels. A method for coding digital data includes determining a first data transition, generating a code that includes at least one additional level that minimizes data skew in the first data transition, and coding the first data transition with the additional level in the code.

29 Claims, 14 Drawing Sheets

| | V1 | V2 | V3 | V4 | V5 | ANALOG LEVEL |
|---|---|---|---|---|---|---|
| 10 | 0 | X | X | X | X | 1.8V |
| 11 | 1 | 1 | X | X | X | 1.6V |
| 01 | 1 | X | 1 | 1 | X | 1.4V |
| 00 | 1 | X | X | 1 | X | 1.2V |
| SS | 1 | X | X | X | 1 | 1.0V |

|    | VD1 | VD2 | VD3 | VD4 |
|----|-----|-----|-----|-----|
| 10 | 1   | 1   | 1   | 1   |
| 11 | 0   | 1   | 1   | 1   |
| 01 | 0   | 0   | 1   | 1   |
| 00 | 0   | 0   | 0   | 1   |
| SS | 0   | 0   | 0   | 0   |

1200

US 7,355,532 B2

VOLTAGE LEVEL CODING SYSTEM AND METHOD

BACKGROUND OF THE INVENTION

This application claims the priority of Korean Patent Application No. 04-47638, filed on Jun. 24, 2004, in the Korean Intellectual Property Office, the disclosure of which is incorporated herein in its entirety by reference.

1. Field

This invention relates to a coding system and method and, more particularly, to a voltage level coding system and method.

2. Background

FIG. 1 is a block diagram of a typical data transmission system 100, including a transmitter 102 and receiver 104. The transmitter 102 receives a digital signal DATA_IN and converts it into a transmissible analog DATA signal using its Digital-To-Analog converter (DAC) 106. The transmitter 102 transmits the analog signal DATA to an Analog-To-Digital converter (ADC) 108 in the receiver 104. The ADC 108 converts the analog signal DATA into the digital signal DATA_OUT.

The transmitter 102 and, more particularly, the ADC 106, may encode the DATA_IN signal before transmitting it as the DATA signal to the receiver 104. The transmitter 102 may encode the DATA_IN signal using a variety of transmission codes including 8B/10B coding.

8B/10B coding is well suited for and widely used in high speed local area networks and computer links because it is a Direct Current (DC) balanced code. A DC balanced transmission code—a code that is DC free or has a constant DC level regardless of data patterns—is highly desirable because it allows transmission system simplification. This simplification ultimately reduces system costs and may improve reliability.

8B/10B coding involves examining each data octet and assigning a 10 bit code. One approach involves splitting 8 bit wide data into two packets or nibbles. The first nibble includes the 5 least significant bits while the second nibble includes the 3 most significant bits. The 5 bit nibbles are encoded into a 6 bit code and the 3 bit nibbles are encoded into 4 bit code. Both encoded nibbles form the 10 bit code packet that is serially transmitted from, e.g., the transmitter 102 to the receiver 104. 8B/10B coding tables are well known and shown in, for example, U.S. Pat. No. 5,387,911 to Gleichert, issued Feb. 7, 1995.

The 10 bit code packets must either contain five ones and five zeros or four ones and six zeros, or six ones and four zeros. This ensures that too many consecutive ones and zeros do not occur between code packets. To maintain the DC balance, a calculation called running disparity is used to keep the number of zeros transmitted the same as the number of transmitted ones.

8B/10B coding is disadvantageous for several reasons. One disadvantage is that 8B/10B coding uses 10 bits for each 8 bits of data and therefore drops data rate speed relative to line speed. For instance, to gain a data rate of 1 Gbps, the line speed has to be 10/8×1=1.25 Gbps.

Another disadvantage is that transitions between the highest and lowest levels decrease data transmission frequency characteristics. FIG. 2 is a diagram of voltage amplitude over time for 8B/10B coded data with a variety of transitions between different levels superimposed over one another. FIG. 3 is an 8B/10B coding state transition diagram. FIGS. 2 and 3 assume a 1.2V voltage level produces a logic state 00 and a 1.8V voltage level produces a logic state 10. Referring to FIGS. 2 and 3, the diagrams show the response of various 8B/10B coded packets as they transition from one state to another, e.g., from a 10 to 11 to 10 or from 11 to 00 to 11, and so on. As shown in FIG. 3, the longest transition occurs when the coded packets transition between states 00 and 10 or vice versa. These long state transitions create a wide eye opening that adversely affects high frequency data transmission because the larger the voltage transition, the longer it takes the signal to reach the appropriate voltage signal level and consequently, the appropriate code state.

Accordingly, a need remains for an improved coding system and method.

INVENTION SUMMARY

It is an object of the present invention to overcome the disadvantages associated with prior systems and methods.

A voltage level coding system and method includes a level encoder having an input to receive data segments coded using a first code and an output to supply second data codes indicating one of $2^N$ plus at least one additional voltage level to which each data segment is assigned. A converter converts the second data codes into such voltage levels. And a controller output supplies the voltage levels.

The level encoder may receive the data segments in the first code and the level encoder may supply data segments in the second code.

The first code may include 1s and 0s and the second code may include 1s, 0s, and Ss.

The level encoder may include a serial to parallel converter that converts serial data segments in the first code into parallel data segments in the first code. An input latch latches the parallel data segments in the first code. A coding block codes the parallel data segments in the first code to parallel data segments in the second code. An output latch latches the parallel data segments in the second code. And a parallel to serial converter converts the parallel data segments in the second code to serial data segments in the second code.

The converter may include a pre-driver to receive the data segments in the second code and a multi-level driver to generate the voltage levels responsive to the pre-driver.

The system may include a second converter to convert the voltage levels into second data codes and a level decoder having an input to receive the second data codes and an output to supply data segments in the second data code.

A method for coding digital data for transmission in an analog channel includes determining a first data transition, generating a code that includes at least one additional level that minimizes data skew in the first data transition, and coding the first data transition with the additional level in the code.

The first data transition may be a low to high data transition.

The determining may include determining a transition from the lowest to the highest level.

The determining may include determining a transition between 00 and 10.

The generating the code may include generating the code with an additional SS level.

The generating the code with the additional SS level may include generating the SS level to be closer to a 00 level than it is to a 10 level.

The method may include coding the digital data from a first code to a second code that includes the at least one level.

The coding may include applying the coded digital data to an input of an N-bit digital-to-analog converter and generating $2^N$ plus the at least one additional level on an output of the converter.

A memory system includes a controller and a memory device. The controller, in turn, includes a level encoder having an input to receive data segments and an output to supply data codes indicating one of $2^N$ plus at least one additional voltage level to which each data segment is assigned. A first converter converts the data codes into such voltage levels and a controller output to supply the voltage levels. The memory device, in turn, includes an input to receive the voltage levels from the controller, a second converter to convert the voltage levels into data codes, and a level decoder having an input to receive the data codes and an output to supply data segments.

The memory device may include an analog data channel to connect the controller and the memory to which the voltage levels are applied.

The level encoder may assign the at least one additional voltage level to a low to high data transition.

The level encoder may assign the at least one additional voltage level to a lowest to highest data transition.

The at least one additional voltage level may be closer to a 00 level than it is to a 10 level.

The first converter may be an N-bit digital to analog converter and the first converter may generate $2^N$ plus the at least one additional level on an output of the first converter.

The second converter may be an N-bit digital to analog converter and the second converter may generate $2^N$ plus the at least one additional level on an output of the second converter.

BRIEF DRAWINGS DESCRIPTION

The foregoing and other objects, features, and advantages of the invention(s) will become more readily apparent from the detailed description of invention embodiments that references the following drawings.

FIG. 10 is a coding table associated with transmitter 202 according to an embodiment of the present invention.

DETAILED DESCRIPTION

Figure 4:
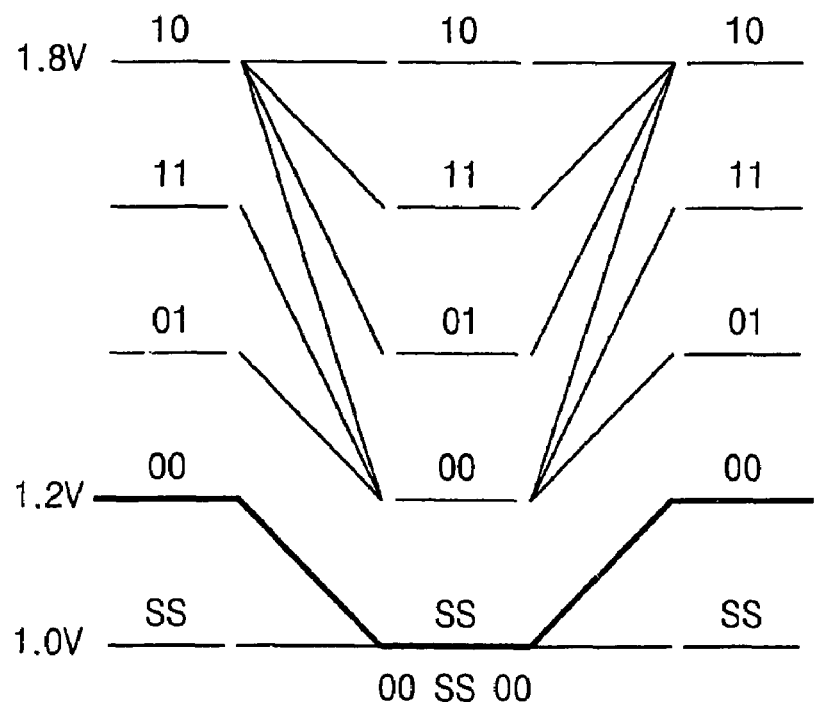
FIG. 4 is a coding state transition diagram according to an embodiment of the present invention.

FIG. 4 is a coding transition diagram according to an embodiment of the present invention. Referring to FIG. 4, the inventive coding system includes an additional code SS indicating an additional voltage level relative to existing coding systems, e.g., 8B/10B coding. The code SS may indicate a predetermined voltage level substantially closer to the voltage level indicated by the code 00 than the code 10. For example, the SS code may indicate a voltage level about equal to 1.0V, where the code 00 indicates a voltage level about equal to 1.2V and the code 10 indicates a voltage level about equal to 1.8V.

The inventive coding system may replace a data pattern exhibiting undesirable high frequency performance, e.g., the pattern 00 10 00, with a pattern that exhibits more desirable high frequency performance, e.g., the pattern 00 SS 00. Put differently, the inventive coding system replaces the longest voltage transition between the 00 and 10, with a shorter transition from 00 to SS, where the code SS indicates a voltage level closer to the voltage level indicated by 00 than the voltage level indicated by 10. The result is a lower transition time that minimizes data skew and improves high frequency performance.

Figure 5:
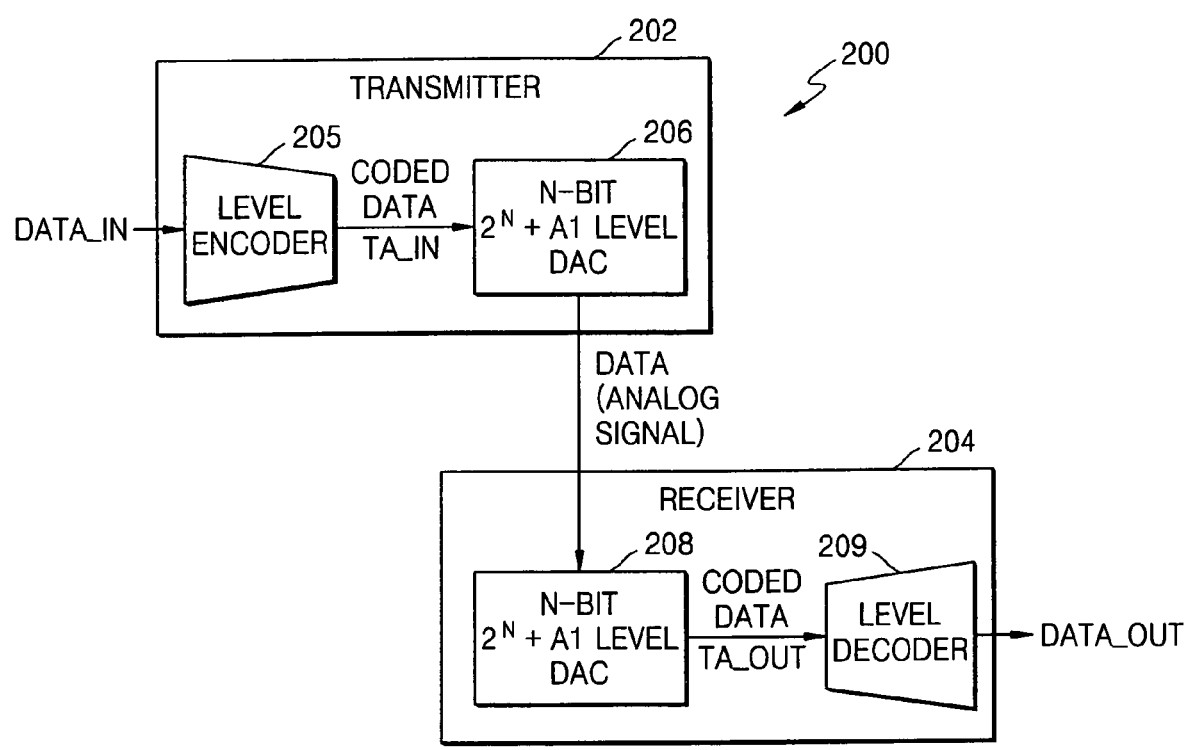
FIG. 5 is a block diagram of a data transmission system 200 according to an embodiment of the present invention.

FIG. 5 is a block diagram of a data transmission system 200 according to an embodiment of the present invention. Referring to FIG. 5, the transmission system 200 includes a transmitter 202 that receives the digital signal DATA_IN and converts it into a transmissible analog DATA signal using a level encoder 205 and a DAC 206. The transmitter 202 transmits the analog signal DATA to a receiver 204 and, more particularly, to a ADC 208 and a level decoder 209 in the receiver 204. The receiver 204 receives and decodes the analog signal DATA to produce the digital signal DATA_OUT.

Figure 6:
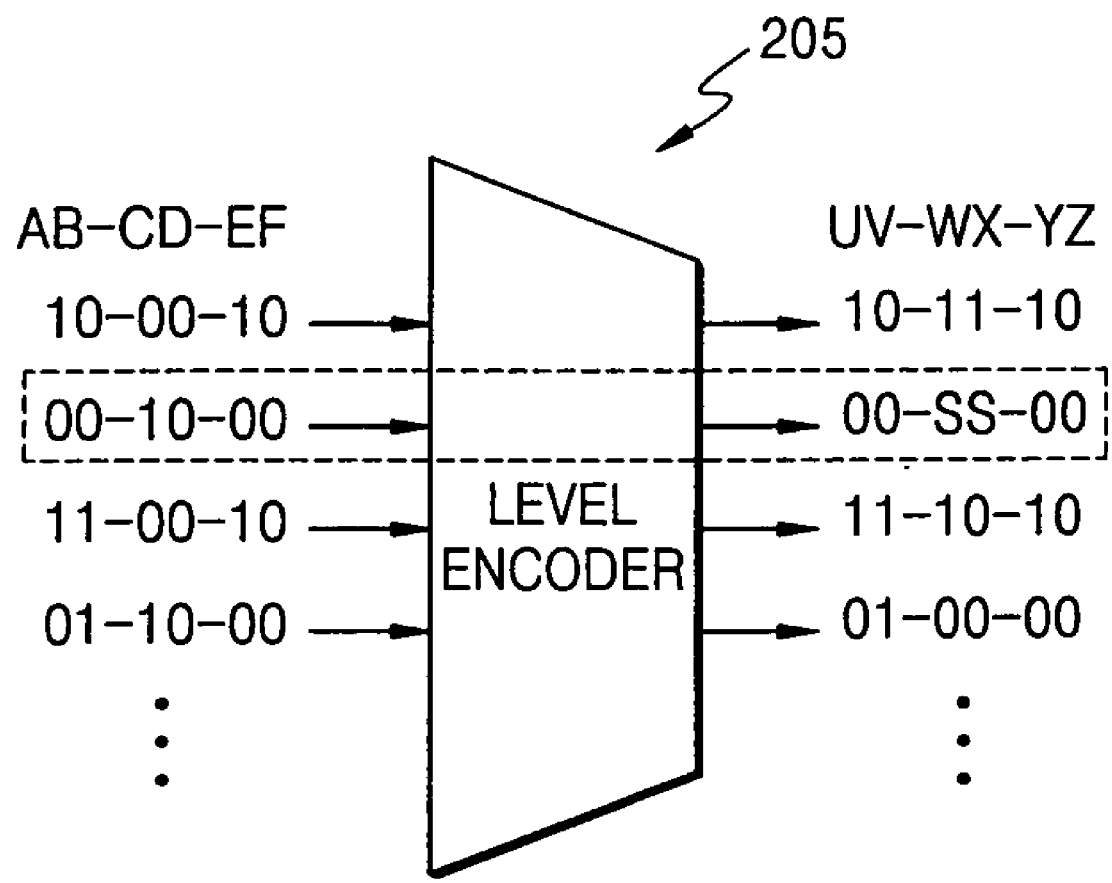
FIG. 6 is a block diagram of an embodiment of the level decoder 205 shown in FIG. 5.

FIG. 6 is a block diagram of an embodiment of the level encoder 205 shown in FIG. 5. Referring to FIG. 6, the level encoder 205 receives data segments, e.g., data segments AB, CD, and EF, from the digital DATA_IN signal and encodes each data segment with a code, e.g., UV, WX, and YZ that includes at least one additional code SS indicating at least one additional voltage level. Put differently, the input DATA_IN signal includes data segments coded with 1s and 0s where as the coded DATA signal includes data segments coded with 1s, 0s, and Ss.

As explained above, the code SS may indicate a voltage level that minimizes data skew by reducing a data segment transition time. For example, the code SS may be set at 1.0V where 00 indicates 1.2 and 10 indicates 1.8V. The inventing coding system may replace a data transition between 00 and 10 that requires a voltage swing from e.g., 1.2V to 1.8 with a voltage swing from e.g., 1.2V to 1.0V. In FIG. 6, three data segments each with two bits (e.g., AB, CD, EF) are shown, but it should be clear to a person of skill in the art that the invention broadly covers any number of data segments with any number of bits associated with each data segment.

Figure 7:
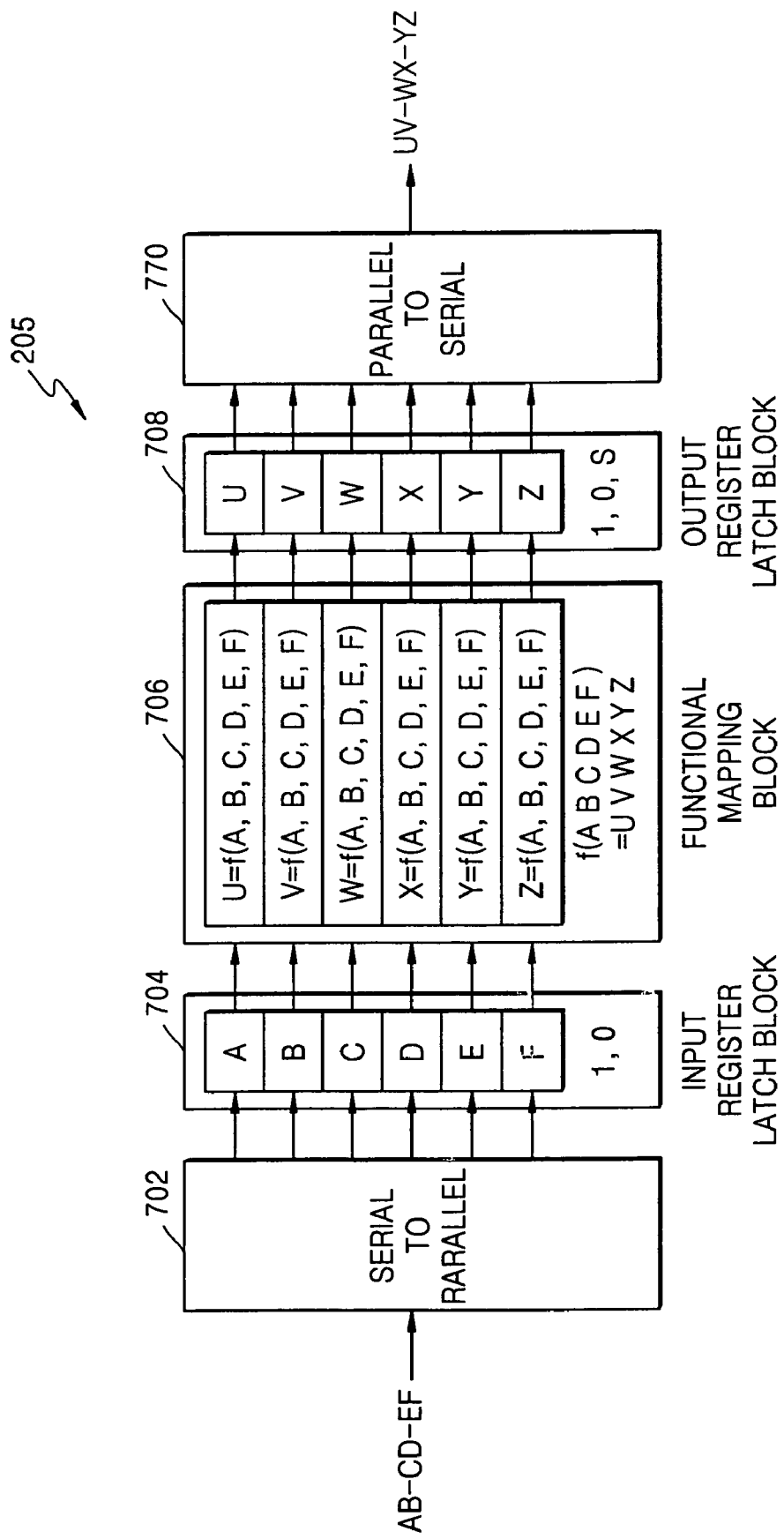
FIG. 7 is a more detailed block diagram of an embodiment of the level encoder 205 shown in FIGS. 5 and 6.

FIG. 7 is a more detailed block diagram of an embodiment of the level encoder 205 shown in FIGS. 5 and 6. Referring to FIG. 7, the level encoder 205 includes a serial to parallel converter 702 that converts the serial data segments AB, CD, EF from the DATA_IN signal into parallel segments 704 (e.g., A, B, C, D, E, and F). The parallel segments 704 may be coded with any of a variety of transmission codes, including those based on 1s and 0s, e.g., 8B/10B coding. A functional mapping block or circuit 706 maps or codes the parallel data segments 704 into parallel segments 708 based on the inventive code that includes N-bit plus one additional code (e.g. SS) indicating an additional voltage level. That is, the functional mapping block 706 codes the parallel data segments 704 in a first code based on 1s and 0s to parallel data segments 708 in a second code based on 1s, 0s, and Ss.

Figure 1:
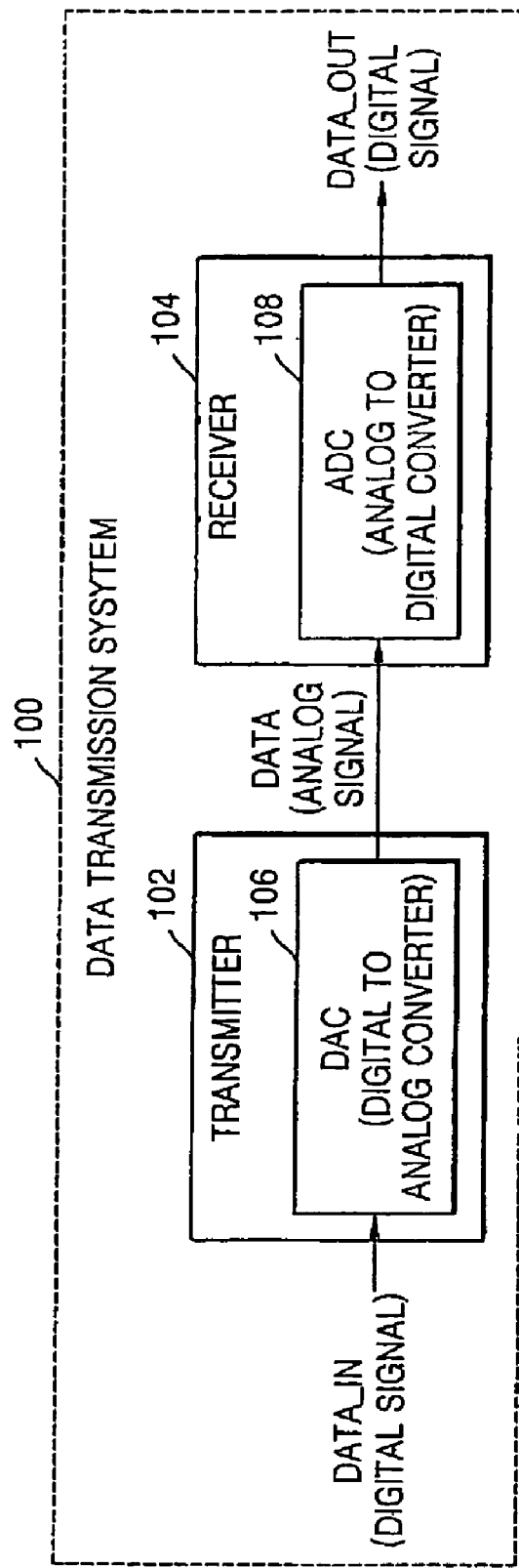
FIG. 1 is a block diagram of a typical data transmission system 100.
Figure 2:
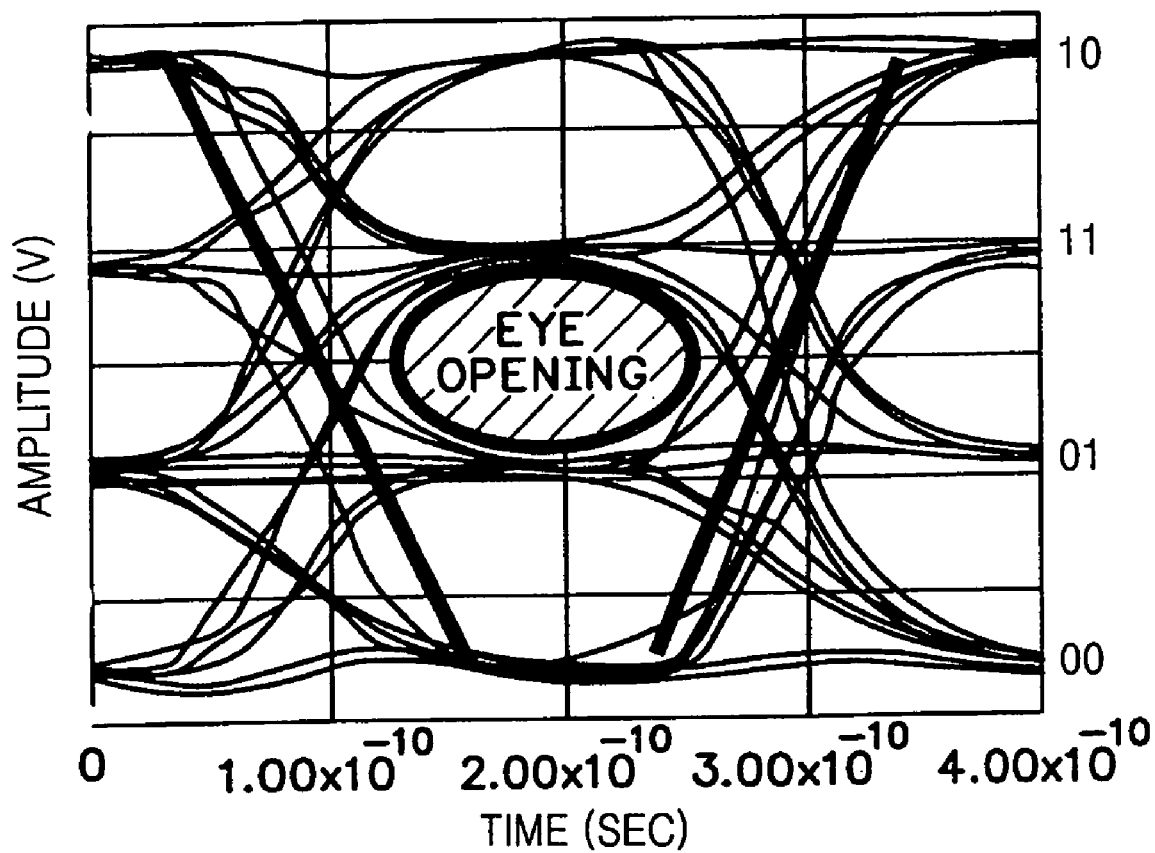
FIG. 2 is a diagram of voltage amplitude over time for 8B/10B coded data.
Figure 3:
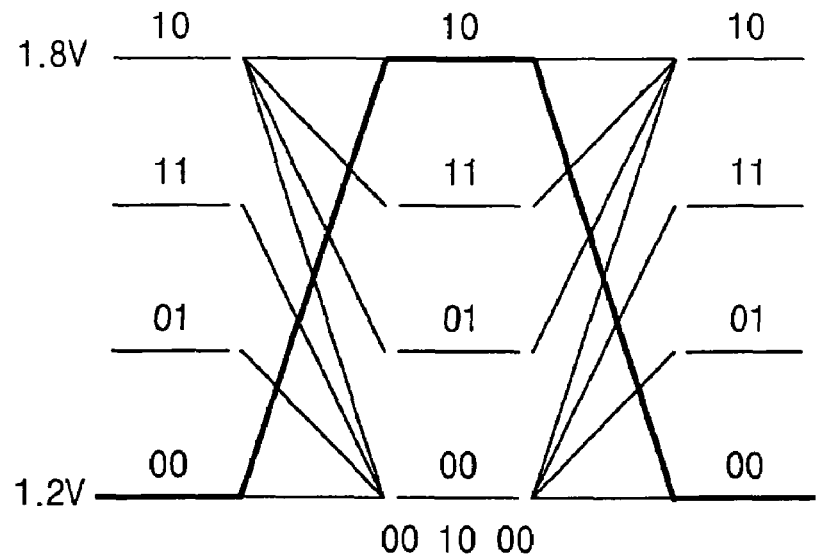
FIG. 3 is an 8B/10B coding state transition diagram.

Table 1 is an exemplary table for mapping 6-bit data segments that can change among four possible levels (00, 01, 11, 10), as shown in FIG. 3, to 6-bit data segments that can change among five possible levels (ss, 00, 01, 11, 10), as shown in FIG. 4. This is the mapping performed by encoder 205. All possible combinations of transitions among the four levels are listed in the Uncoded column, and all possible combinations of transitions among the five levels are listed in the Coded column. The shaded areas in the Uncoded column are all of the combinations with worst case transitions in a 4-level code, i.e., adjacent transitions that are separated by four levels. Put differently, the shaded areas are those combinations with adjacent transitions that move between 00 and 10 or vice versa. Each possible combination of transitions in the left column is numbered 1-64.

TABLE 1

| | Uncoded (64 cases) | | Coded (75 cases) |
|---|---|---|---|
| 1 | 1 0 - 1 0 - 1 0 | 1 | 1 0 - 1 0 - 1 0 |
| 2 | 1 0 - 1 0 - 1 1 | 2 | 1 0 - 1 0 - 1 1 |
| 3 | 1 0 - 1 0 - 0 1 | 3 | 1 0 - 1 0 - 0 1 |
| 4 | 1 0 - 1 0 - 0 0 | | 1 0 - 1 0 - 0 0 |
| 5 | 1 0 - 1 1 - 1 0 | | 1 0 - 1 0 - s s |
| 6 | 1 0 - 1 1 - 1 1 | 4 | 1 0 - 1 1 - 1 0 |
| 7 | 1 0 - 1 1 - 0 1 | 5 | 1 0 - 1 1 - 1 1 |
| 8 | 1 0 - 1 1 - 0 0 | 6 | 1 0 - 1 1 - 0 1 |
| 9 | 1 0 - 0 1 - 1 0 | 7 | 1 0 - 1 1 - 0 0 |
| 10 | 1 0 - 0 1 - 1 1 | | 1 0 - 1 1 - s s |
| 11 | 1 0 - 0 1 - 0 1 | 8 | 1 0 - 0 1 - 1 0 |
| 12 | 1 0 - 0 1 - 0 0 | 9 | 1 0 - 0 1 - 1 1 |
| 13 | 1 0 - 0 0 - 1 0 | 10 | 1 0 - 0 1 - 0 1 |
| 14 | 1 0 - 0 0 - 1 1 | 11 | 1 0 - 0 1 - 0 0 |
| 15 | 1 0 - 0 0 - 0 1 | 12 | 1 0 - 0 1 - s s |
| 16 | 1 0 - 0 0 - 0 0 | | 1 0 - 0 0 - 1 0 |
| 17 | 1 1 - 1 0 - 1 0 | | 1 0 - 0 0 - 1 1 |
| 18 | 1 1 - 1 0 - 1 1 | | 1 0 - 0 0 - 0 1 |
| 19 | 1 1 - 1 0 - 0 1 | | 1 0 - 0 0 - 0 0 |
| 20 | 1 1 - 1 0 - 0 0 | | 1 0 - 0 0 - s s |
| 21 | 1 1 - 1 1 - 1 0 | | 1 0 - s s - 1 0 |
| 22 | 1 1 - 1 1 - 1 1 | | 1 0 - s s - 1 1 |
| 23 | 1 1 - 1 1 - 0 1 | | 1 0 - s s - 0 1 |
| 24 | 1 1 - 1 1 - 0 0 | | 1 0 - s s - 0 0 |
| 25 | 1 1 - 0 1 - 1 0 | | 1 0 - s s - s s |
| 26 | 1 1 - 0 1 - 1 1 | 13 | 1 1 - 1 0 - 1 0 |
| 27 | 1 1 - 0 1 - 0 1 | 14 | 1 1 - 1 0 - 1 1 |
| 28 | 1 1 - 0 1 - 0 0 | 15 | 1 1 - 1 0 - 0 1 |
| 29 | 1 1 - 0 0 - 1 0 | | 1 1 - 1 0 - 0 0 |
| 30 | 1 1 - 0 0 - 1 1 | | 1 1 - 1 0 - s s |
| 31 | 1 1 - 0 0 - 0 1 | 16 | 1 1 - 1 1 - 1 0 |
| 32 | 1 1 - 0 0 - 0 0 | 17 | 1 1 - 1 1 - 1 1 |
| 33 | 0 1 - 1 0 - 1 0 | 18 | 1 1 - 1 1 - 0 1 |
| 34 | 0 1 - 1 0 - 1 1 | 19 | 1 1 - 1 1 - 0 0 |
| 35 | 0 1 - 1 0 - 0 1 | | 1 1 - 1 1 - s s |
| 36 | 0 1 - 1 0 - 0 0 | 20 | 1 1 - 0 1 - 1 0 |
| 37 | 0 1 - 1 1 - 1 0 | 21 | 1 1 - 0 1 - 1 1 |
| 38 | 0 1 - 1 1 - 1 1 | 22 | 1 1 - 0 1 - 0 1 |
| 39 | 0 1 - 1 1 - 0 1 | 23 | 1 1 - 0 1 - 0 0 |
| 40 | 0 1 - 1 1 - 0 0 | 24 | 1 1 - 0 1 - s s |

TABLE 1-continued

| | | | |
|---|---|---|---|
| 41 | 0 1 - 0 1 - 1 0 | | 1 1 - 0 0 - 1 0 |
| 42 | 0 1 - 0 1 - 1 1 | 25 | 1 1 - 0 0 - 1 1 |
| 43 | 0 1 - 0 1 - 0 1 | 26 | 1 1 - 0 0 - 0 1 |
| 44 | 0 1 - 0 1 - 0 0 | 27 | 1 1 - 0 0 - 0 0 |
| 45 | 0 1 - 0 0 - 1 0 | 28 | 1 1 - 0 0 - s s |
| 46 | 0 1 - 0 0 - 1 1 | | 1 1 - s s - 1 0 |
| 47 | 0 1 - 0 0 - 0 1 | | 1 1 - s s - 1 1 |
| 48 | 0 1 - 0 0 - 0 0 | | 1 1 - s s - 0 1 |
| 49 | 0 0 - 1 0 - 1 0 | | 1 1 - s s - 0 0 |
| 50 | 0 0 - 1 0 - 1 1 | | 1 1 - s s - s s |
| 51 | 0 0 - 1 0 - 0 1 | 29 | 0 1 - 1 0 - 1 0 |
| 52 | 0 0 - 1 0 - 0 0 | 30 | 0 1 - 1 0 - 1 1 |
| 53 | 0 0 - 1 1 - 1 0 | 31 | 0 1 - 1 0 - 0 1 |
| 54 | 0 0 - 1 1 - 1 1 | | 0 1 - 1 0 - 0 0 |
| 55 | 0 0 - 1 1 - 0 1 | | 0 1 - 1 0 - s s |
| 56 | 0 0 - 1 1 - 0 0 | 32 | 0 1 - 1 1 - 1 0 |
| 57 | 0 0 - 0 1 - 1 0 | 33 | 0 1 - 1 1 - 1 1 |
| 58 | 0 0 - 0 1 - 1 1 | 34 | 0 1 - 1 1 - 0 1 |
| 59 | 0 0 - 0 1 - 0 1 | 35 | 0 1 - 1 1 - 0 0 |
| 60 | 0 0 - 0 1 - 0 0 | | 0 1 - 1 1 - s s |
| 61 | 0 0 - 0 0 - 1 0 | 36 | 0 1 - 0 1 - 1 0 |
| 62 | 0 0 - 0 0 - 1 1 | 37 | 0 1 - 0 1 - 1 1 |
| 63 | 0 0 - 0 0 - 0 1 | 38 | 0 1 - 0 1 - 0 1 |
| 64 | 0 0 - 0 0 - 0 0 | 39 | 0 1 - 0 1 - 0 0 |
| | | 40 | 0 1 - 0 1 - s s |
| | | | 0 1 - 0 0 - 1 0 |
| | | 41 | 0 1 - 0 0 - 1 1 |
| | | 42 | 0 1 - 0 0 - 0 1 |
| | | 43 | 0 1 - 0 0 - 0 0 |
| | | 44 | 0 1 - 0 0 - s s |
| | | | 0 1 - s s - 1 0 |
| | | | 0 1 - s s - 1 1 |
| | | 45 | 0 1 - s s - 0 1 |
| | | 46 | 0 1 - s s - 0 0 |
| | | 47 | 0 1 - s s - s s |
| | | | 0 1 - 1 0 - 1 0 |
| | | | 0 0 - 1 0 - 1 1 |
| | | | 0 0 - 1 0 - 0 1 |
| | | | 0 0 - 1 0 - 0 0 |
| | | | 0 0 - 1 0 - s s |

TABLE 1-continued

| | |
|---|---|
| 48 | 0 0 - 1 1 - 1 0 |
| 49 | 0 0 - 1 1 - 1 1 |
| 50 | 0 0 - 1 1 - 0 1 |
| 51 | 0 0 - 1 1 - 0 0 |
|    | 0 0 - 1 1 - s s |
| 52 | 0 0 - 0 1 - 1 0 |
| 53 | 0 0 - 0 1 - 1 1 |
| 54 | 0 0 - 0 1 - 0 1 |
| 55 | 0 0 - 0 1 - 0 0 |
| 56 | 0 0 - 0 1 - s s |
|    | 0 0 - 0 0 - 0 0 |
| 57 | 0 0 - 0 0 - 1 1 |
| 58 | 0 0 - 0 0 - 0 1 |
| 59 | 0 0 - 0 0 - 0 0 |
| 60 | 0 0 - 0 0 - s s |
|    | 0 0 - s s - 1 0 |
|    | 0 0 - s s - 1 1 |
| 61 | 0 0 - s s - 0 1 |
| 62 | 0 0 - s s - 0 0 |
| 63 | 0 0 - s s - s s |
|    | s s - 1 0 - 1 0 |
|    | s s - 1 0 - 1 1 |
|    | s s - 1 0 - 0 1 |
|    | s s - 1 0 - 0 0 |
|    | s s - 1 0 - s s |
|    | s s - 1 1 - 1 0 |
|    | s s - 1 1 - 1 1 |
|    | s s - 1 1 - 0 1 |
|    | s s - 1 1 - 0 0 |
|    | s s - 1 1 - s s |
| 64 | s s - 0 1 - 1 0 |
| 65 | s s - 0 1 - 1 1 |
| 66 | s s - 0 1 - 0 1 |
| 67 | s s - 0 1 - 0 0 |
| 68 | s s - 0 1 - s s |
|    | s s - 0 0 - 1 0 |
| 69 | s s - 0 0 - 1 1 |
| 70 | s s - 0 0 - 0 1 |
| 71 | s s - 0 0 - 0 0 |
| 72 | s s - 0 0 - s s |
|    | s s - s s - 1 0 |
|    | s s - s s - 1 1 |
| 73 | s s - s s - 0 1 |
| 74 | s s - s s - 0 0 |
| 75 | s s - s s - s s |

The shared areas in the Coded column represent all of the combinations of worst case transitions in a 5-level code, i.e., adjacent transitions that are separated by 4 or 5 levels. In other words, these shaded areas are those combinations with adjacent transitions that move between ss and 11, between ss and 10, and between 00 and 10. The number in the first column of the Coded combinations corresponds to the same number in the Uncoded combinations, i.e., each numbered combination in the Uncoded column is mapped to the corresponding numbered combination in the Coded column by encoder 205. There are 75 possible combinations that include adjacent transitions that are separated by 3 or fewer levels. Only the first 64 are required. Thus, the 5-level code enables all combinations to be mapped to combinations that have transitions between, at most, three levels. The 4-level code, on the other hand, required some transitions, those shaded in the Uncoded column, between four levels A person of reasonable skill in the art should understand Table 1 as exemplary and easily extendible to larger or smaller data segments having fewer or greater levels.

A parallel to serial converter 710 converts the coded parallel data segments 708 (e.g., U, V, W, X, Y, and Z) to coded serial data segments (e.g., UV, WX, and YZ).

Figure 8:
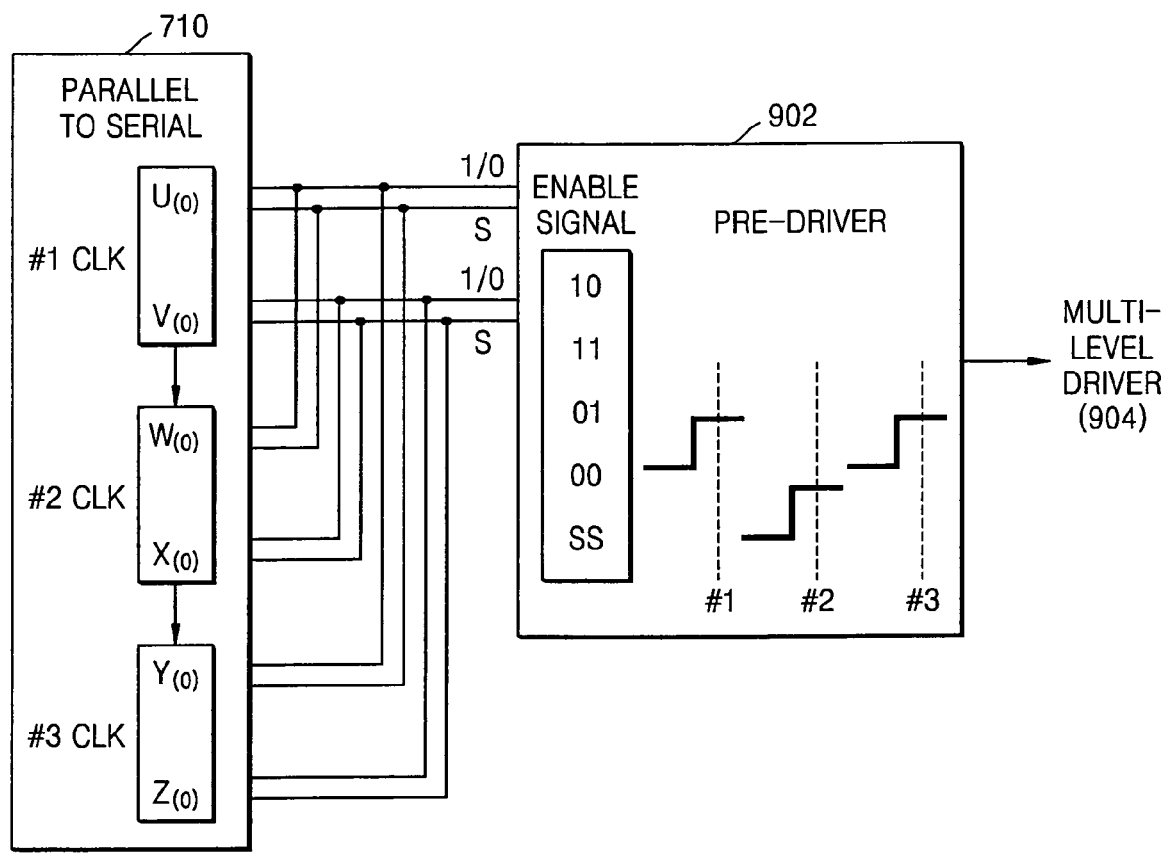
FIG. 8 is a block diagram of an embodiment of portions of the level encoder 205 and DAC 206 shown in FIG. 5.

FIG. 8 is a block diagram of an embodiment of portions of the level encoder 205 and DAC 206 shown in FIG. 5. The parallel to serial converter 710 serially clocks data segments to a pre-driver 902 in the ADC 208. In an embodiment, the parallel to serial converter 710 serially clocks pairs of data segments on four lines, two for each digital place. One line indicates a 1 or 0 while the other line indicates S. When the S line is low, the value is whatever is on the other line, either 1 or 0. When the S line is high, the value is S. The parallel to serial converter 710 sequentially clocks in the values to the pre-driver 902 as depicted in the clock timing diagram shown inside the pre-driver 902. The parallel to serial converter 710 may, for example, clock data segments UV in a first clock pulse, data segments WX in a second clock pulse, and data segments YZ in a third clock pulse.

Figure 9:
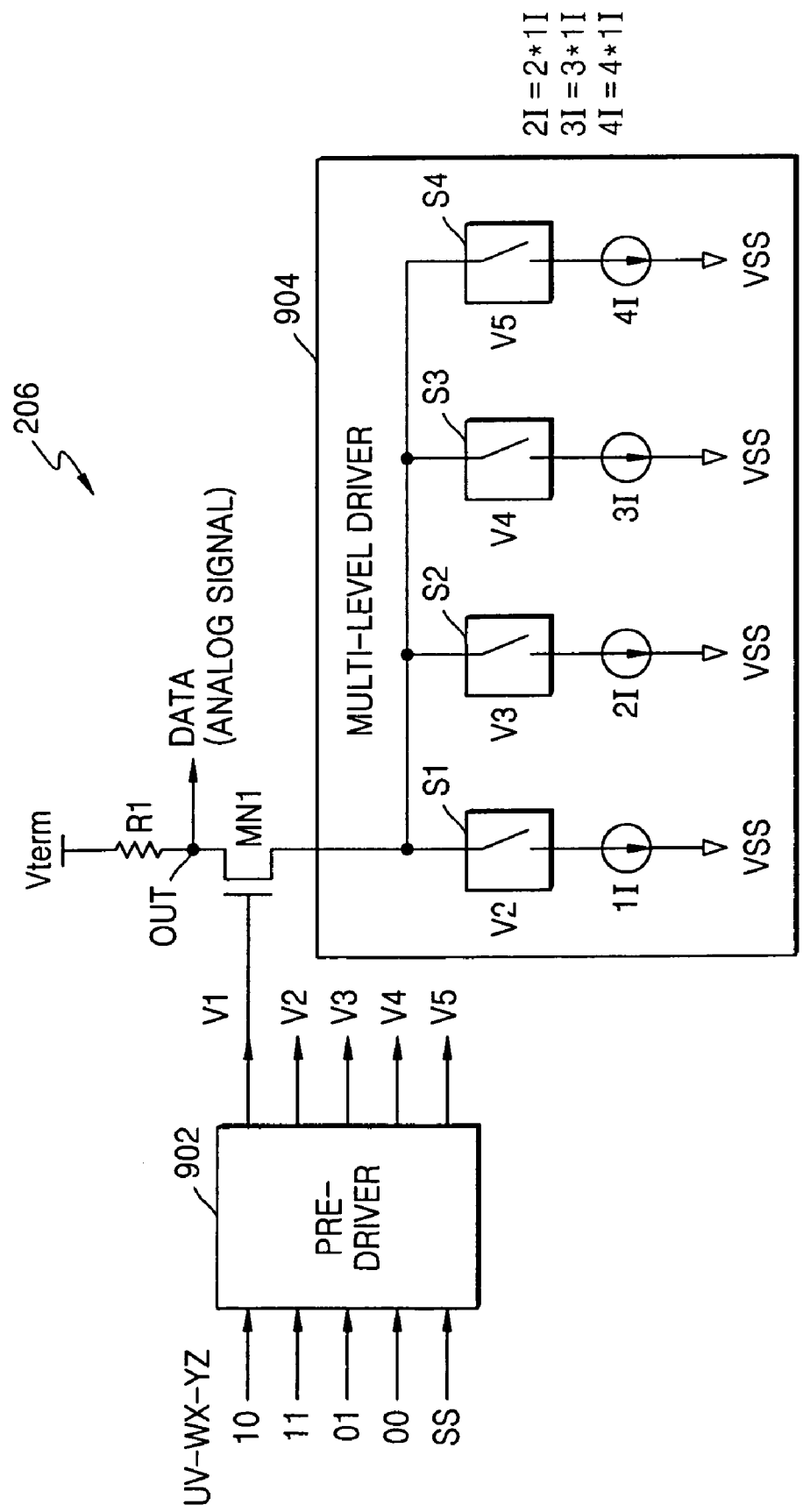
FIG. 9 is a block diagram of an embodiment of the DAC 206 shown in FIG. 5.

FIG. 9 is a block diagram of an embodiment of the DAC 206 shown in FIG. 5. FIG. 10 is a coding table 1000 that illustrates how each of the levels ss through 10 provides a voltage to one of transistors MN1 or S1 to S4 thereby generating one of five different voltage levels in the analog signal sent from transmitter 202 to receiver 204. Referring to FIGS. 9 and 10, the coding table 1000 associates coded data segments (e.g., UV, WX, YZ having codes 10, 11, 01, 00, and SS), to pre-driver 902 values (e.g., V1-V5), to analog voltage levels (e.g., 1.8V, 1.6V, 1.4V, 1.2V, and 1.0V). For example, the pre-driver 902 will output a value VI of 0 for an input data segment coded with 10 that, in turn, will prompt the multi-level driver 904 to output an analog voltage equal to 1.8V. For another example, the pre-driver 902 will output values V1 and V2 of 1 for an input data segment coded with 11 that, in turn, will prompt the multi-level driver 904 to output an analog voltage equal to 1.6. Similarly, the pre-driver 902 will output values V1 and V5 of 1 for an input data segment coded with SS that, in turn, will prompt the multi-level driver 904 to output an analog voltage equal to 1.0V. The DAC 206 may have an N-bit plus an additional level capability. A person of skill in the art should understand that other types and sizes of DACs come within the scope of the present invention.

Figure 11:
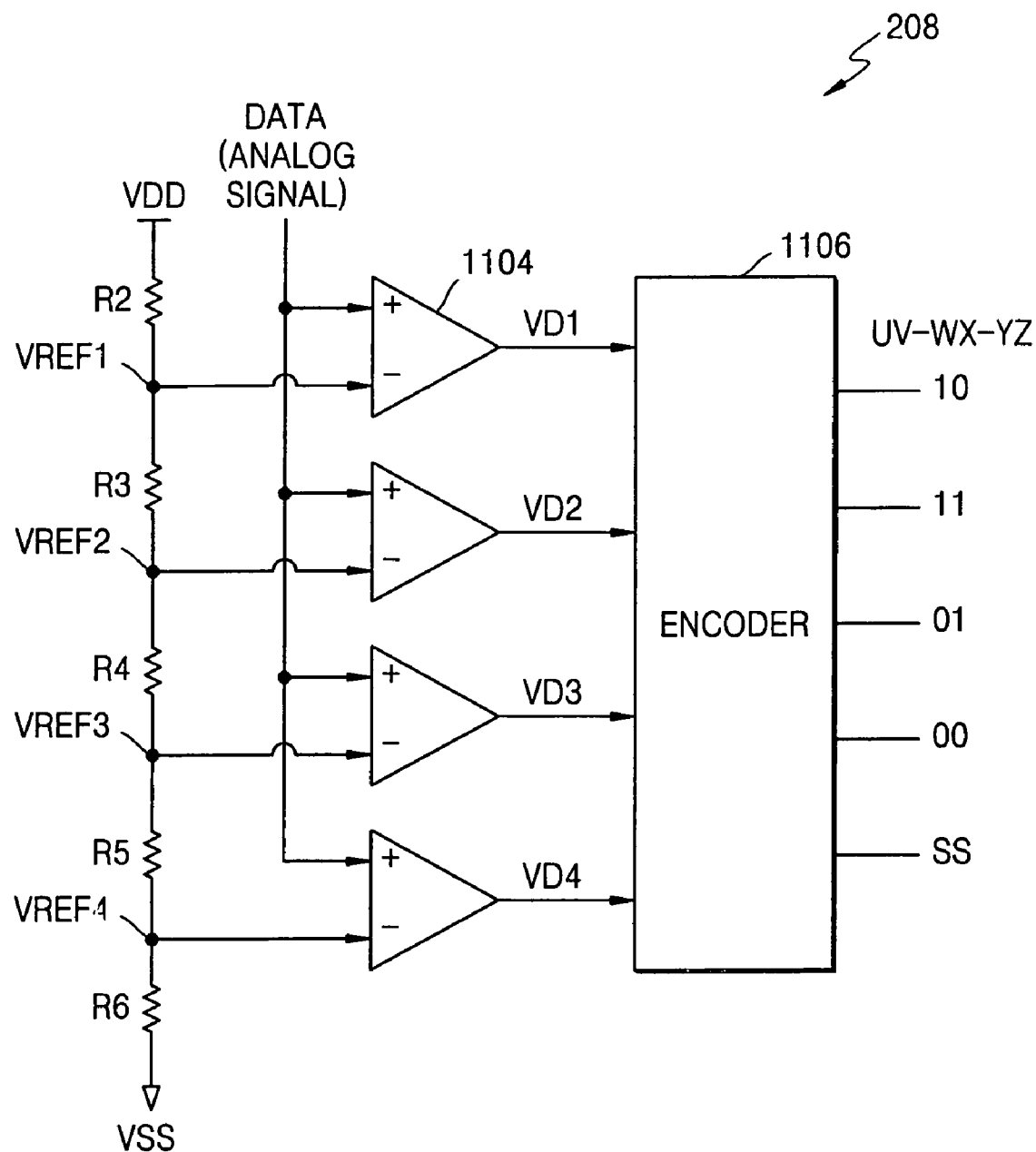
FIG. 11 is a block diagram of an embodiment of the ADC 208 shown in FIG. 5.
Figures 12, 13:
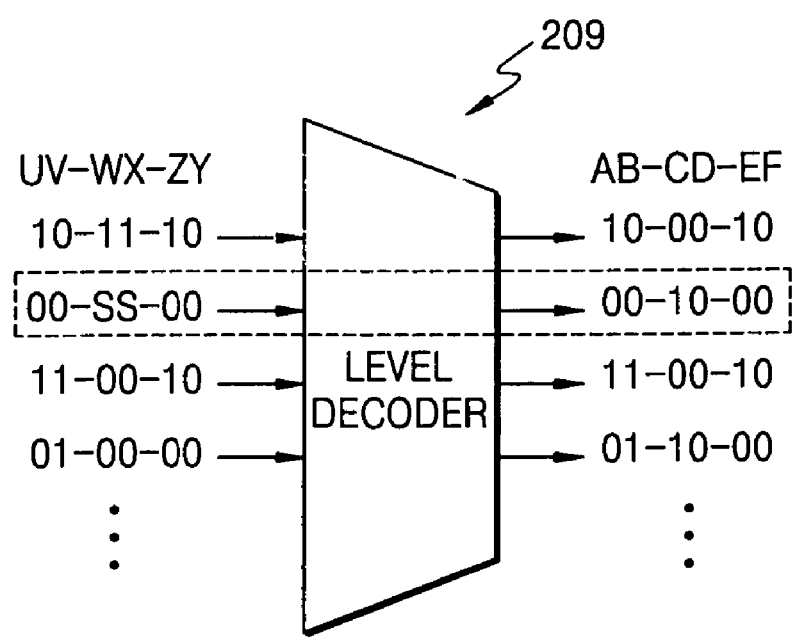
FIG. 12 is a coding table associated with the receiver 204 according to an embodiment of the present invention.
FIG. 13 is a block diagram of an embodiment of the level decoder 209 shown in FIG. 5.

FIG. 11 is a block diagram of an embodiment of the ADC 208 shown in FIG. 5. Referring to FIG. 11, the ADC 208 includes a plurality of serially connected reference resistors e.g., R2-R6, that generate a plurality of reference voltages, e.g., VREF1-VREF4. The reference resistors R2-R6 are serially connected between power supplies VDD and VSS. The reference resistors R2-R6 provide a corresponding plurality of reference voltages VREF1-VREF4 to comparators 1104. The comparators 1104 generate voltages e.g., VD1-VD4, responsive to comparing the analog DATA signal with the reference voltages VREF1-VREF4 provided by the reference resistors R2-R6. An encoder 1106 encodes the voltages VD1-VD4 to data segments UV, WX, and YZ encoded with the inventive code based on 1s, 0s, and Ss as shown in the coding table 1200 (FIG. 12). For example, the voltages VD1-VD4 are all 1, the encoder 1106 outputs a data segment, e.g., UV, coded with 10. For another example, if the voltages VD1-VD4 are all 0, the encoder 1106 outputs a data segment, e.g., WX, coded with SS.

The ADC 208 may have a $2^N$ plus an additional level capability. A person of skill in the art should understand that other types and sizes of ADCs come within the scope of the present invention.

FIG. 13 is a block diagram of an embodiment of the level decoder 209 shown in FIG. 5. Referring to FIG. 13, the level decoder 209 decodes data segments, e.g., data segments UV, WX, and YZ, from the coded DATA_OUT signal that includes at least one additional code SS indicating at least one additional voltage level into (decoded) data segments, e.g., AB, CD, and EF. Put differently, the DATA_IN signal includes data segments having 1s, 0s, and Ss and decodes into data segments having 1s and 0s.

As explained above, the code SS may indicate a voltage level that minimizes data skew lowering or reducing a data segment transition time. For example, the code SS may be set at 1.0V where 00 indicates 1.2 and 10 indicates 1.8V. The inventing coding system may replace a data transition between 00 and 10 that requires a voltage swing from e.g., 1.2V to 1.8 with a voltage swing from e.g., 1.2V to 1.0V. In FIG. 13, three data segments each with two bits (e.g., UV, WX, and ZY) are shown, but it should be clear to a person of skill in the art that the invention broadly covers any number of data segments with any number of bits associated with each data segment.

Figure 14:
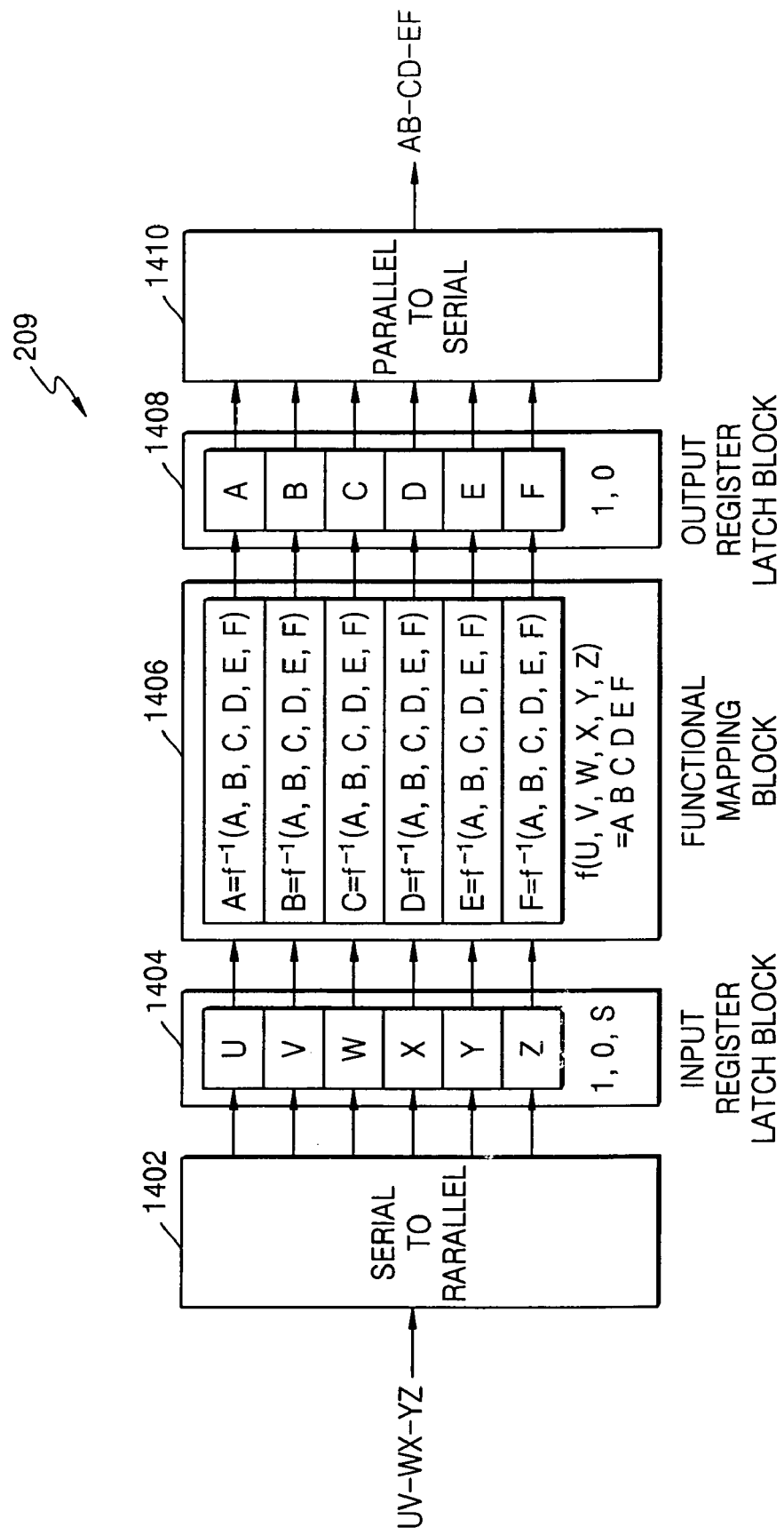
FIG. 14 is a more detailed block diagram of an embodiment of the level decoder 209 shown in FIG. 5.

FIG. 14 is a more detailed block diagram of an embodiment of the level decoder 209 shown in FIGS. 5 and 13. Referring to FIG. 14, the level decoder 209 includes a serial to parallel converter 1402 that converts the serial data segments UV, WX, and YZ from the coded DATA_OUT signal into parallel segments 1404 (e.g., U, V, W, X, Y, and Z). The parallel data segments 1404 may be coded with an inventive transmission code based on 1s, 0s, Ss as we explain above in detail. A functional block or circuit 1406 maps or decodes the parallel data segments 1404 based on N-bit plus one additional code indicating an additional voltage level into parallel segments 1408. The mapping block 1406 may use the values in Table 1 above to map or decode the data segments 1404 into the data segments 1408. A parallel to serial converter 1410 converts the decoded parallel data segments 1408 (e.g., A, B, C, D, E, and F) to decoded serial data segments (e.g., AB, CD, and EF).

Figure 15:
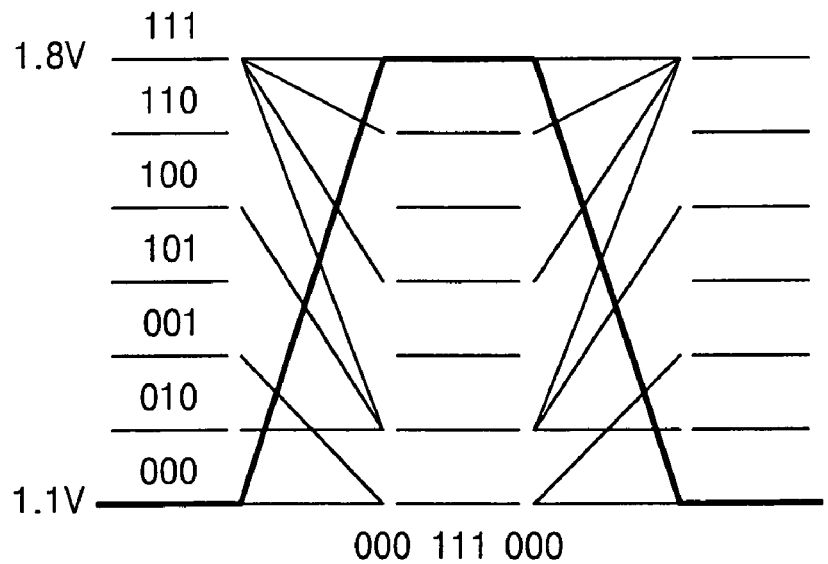
FIG. 15 is an 8B/10B coding state transition diagram.

FIG. 15 is an 8B/10B (three bit) coding state transition diagram. Referring to FIG. 15, the coding state transition diagram shows the response of various 8B/10B coded packets as they transition from one state to another, e.g., from a 111 to 100 to 111 or from 100 to 010 to 100, and so on. As shown in FIG. 15, the longest transition occurs when the coded packets transition between states 000 to 111 to 000. These longest state transitions create a wide eye opening that adversely affects high frequency data transmission because the larger the voltage transition, the longer it takes the signal to reach the appropriate voltage signal level and consequently, the appropriate code state.

Figure 16:
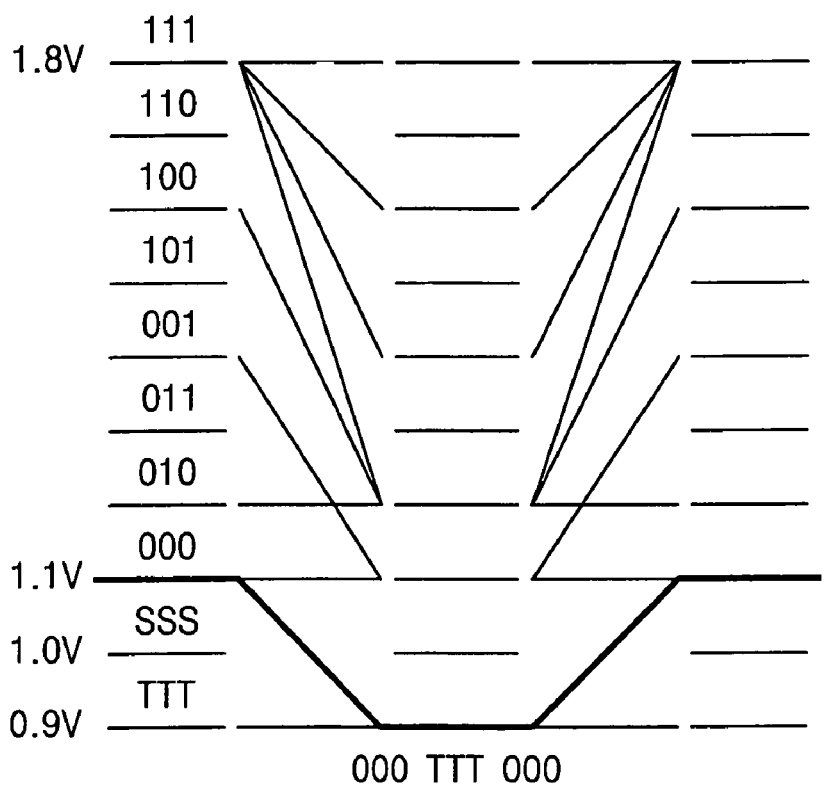
FIG. 16 is a coding transition diagram according to an embodiment of the present invention.

FIG. 16 is a (3-bit) coding transition diagram according to an embodiment of the present invention. Referring to FIG. 16, the inventive coding system may include one or more additional codes, e.g., SSS and TTT, indicating one or more additional voltage levels relative to existing coding systems, e.g., 8B/10B coding. The code SSS may indicate a predetermined voltage level substantially closer to the voltage level indicated by the code 000 than is indicated by the code 111. For example, the SSS code may indicate a voltage level about equal to 1.0V, where the code 000 indicates a voltage level about equal to 1.2V and the code 111 indicates a voltage level about equal to 1.8V. Similarly, the code TTT may indicate a predetermined voltage level substantially closer to the voltage level indicated by the code 000 than is the code 111. For example, the TTT code may indicate a voltage level about equal to 0.9V, where the code 000 indicates a voltage level about equal to 1.2V and the code 111 indicates a voltage level about equal to 1.8V.

The inventive coding system may replace a data pattern exhibiting undesirable high frequency performance, e.g., the pattern 000 111 000, with a pattern that exhibits more desirable high frequency performance, e.g., the pattern 000 TTT 000. Put differently, the inventive coding system replaces the longest voltage transition between the 000 and 111, with a shorter transition from 000 to TTT, where the code TTT indicates a voltage level closer to the voltage level indicated by 000 than the voltage level indicated by 111. The result is a lower transition time that minimizes data skew and improves high frequency performance.

Figure 17:
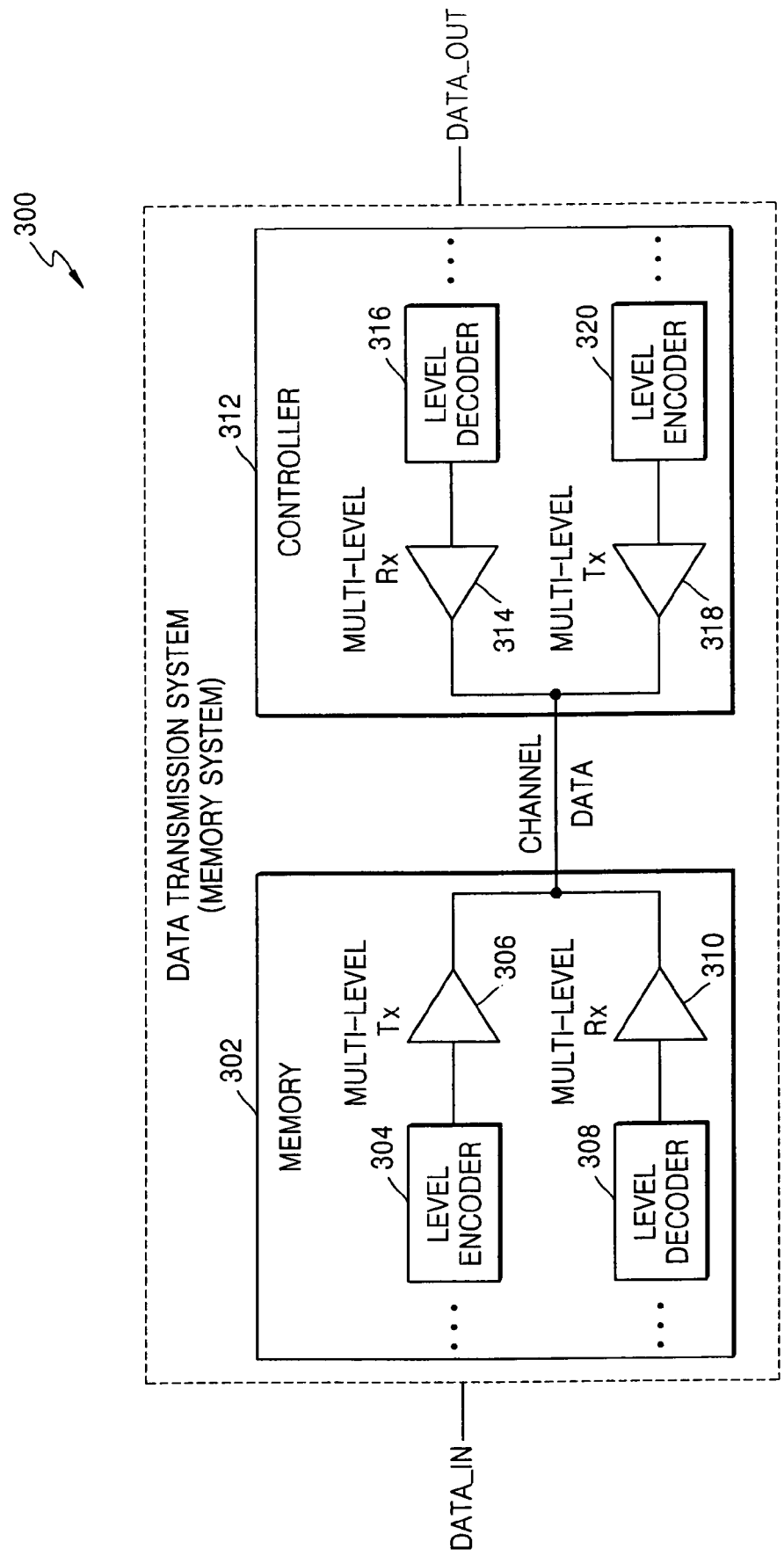
FIG. 17 is a block diagram of a data transmission system 300 according to another embodiment of the present invention.

FIG. 17 is a block diagram of a data transmission system 300, shown only schematically, according to another embodiment of the present invention. Referring to FIG. 17, the transmission system 300 includes a memory system 302 that receives the digital signal DATA_IN and converts it into a transmissible analog DATA signal using an encoder 304, which operates in the manner described above, and a transmitter 306, which converts each encoded digital value to an analog value that is applied to the channel.

The controller 312 receives the channel signal via the analog data channel from the transmitter 306. The controller 312 includes a receiver 314, which converts the analog signal to encoded digital values as described above, and a level decoder 316, which decodes the digital values.

As can be seen data can also be encoded and converted to an analog signal by encoder 320 and transmitter 318, respectively, for transmission from controller 312 to memory 302. Receiver 310 and decoder 308 together receive the analog signal, convert it to encoded digital values and then decode the digital values to produce decoded digital information.

Having illustrated and described the principles of our invention, it should be readily apparent to those skilled in the art that the invention may be modified in arrangement and detail without departing from such principles. I claim all modifications coming within the spirit and scope of the accompanying claims.

I claim the following:

1. A method for coding digital data for transmission in an analog channel in which each data segment is coded with a first code to indicate one of $2^N$ voltage levels, where N is an integer greater than or equal to 2, the method comprising:
    determining a first data transition between adjacent data segments;
    generating a second code in which each data segment coded with the first code is coded to indicate one of $2^N$ voltage levels plus at least one additional voltage level that minimizes data skew in the first data transition; and
    coding the first data transition with the additional voltage level in the code.

2. The method of claim 1 where the determining the first data transition includes determining a low to high data transition.

3. The method of claim 2 where the determining includes determining a transition from the lowest to the highest voltage level.

4. The method of claim 2 where the determining includes determining a transition between 00 and 10.

5. The method of claim 2 where generating the code includes generating the code with an additional SS voltage level.

6. The method of claim 5 where generating the code with the additional SS voltage level includes generating the SS voltage level to be closer to a 00 voltage level than it is to a 10 voltage level.

7. The method of claim 1 where coding the first data transmission includes:
applying the coded digital data to an input of an N-bit digital-to-analog converter, where N is an integer; and
generating $2^N$ plus the at least one additional voltage level on an output of the converter.

8. A system comprising:
a level encoder having an input to receive data segments coded using a first code in which each data segment is coded to indicate one of $2^N$ voltage levels and an output to supply second data codes in which each data segment is coded to indicate one $2^N$ plus at least one additional voltage level to which each data segment is assigned, where N is an integer greater than or equal to 2;
a converter to convert the second data codes into such voltage levels; and
a controller output to supply the voltage levels.

9. The system of claim 8
where the level encoder receives the data segments in the first code; and
where the level encoder supplies data segments in the second code.

10. The system of claim 9
where the first code includes 1 and 0; and
where the second code includes 1,0, and S.

11. The system of claim 8 where the level encoder includes:
a serial to parallel converter to convert serial data segments in the first code into parallel data segments in the first code;
an input latch to latch the parallel data segments in the first code;
a coding block to code the parallel data segments in the first code to parallel data segments in the second code;
an output latch to latch the parallel data segments in the second code; and
a parallel to serial converter to convert the parallel data segments in the second code to serial data segments in the second code.

12. The system of claim 8 where the converter includes:
a pre-driver to receive the data segments in the second code; and
a multi-level driver to generate the voltage levels responsive to the pre-driver.

13. The system of claim 8 comprising:
a second converter to convert the voltage levels into second data codes; and
a level decoder having an input to receive the second data codes and an output to supply data segments in the second data code.

14. A memory system comprising:
a controller comprising:
a level encoder having an input to receive data segments and an output to supply data codes indicating one of $2^N$ plus at least one additional voltage level to which each data segment is assigned, where N is an integer;
a first converter to convert the data codes into such voltage levels;
a controller output to supply the voltage levels; and
a memory device comprising:
an input to receive the voltage levels from the controller;
a second converter to convert the voltage levels into data codes; and
a level decoder having an input to receive the data codes and an output to supply data segments.

15. The memory system of claim 14 where the memory device includes an analog data channel to connect the controller and the memory to which the voltage levels are applied.

16. The memory system of claim 14 where the level encoder assigns the at least one additional voltage level to a low to high data transition.

17. The memory system of claim 16 where the level encoder assigns the at least one additional voltage level to a lowest to highest data transition.

18. The memory system of claim 16 where the at least one additional voltage level is closer to a 00 level than it is to a 10 level.

19. The memory system of claim 14
where the first converter is an N-bit digital to analog converter, where N is an integer; and
where the first converter generates $2^N$ plus the at least one additional level on an output of the first converter.

20. The memory system of claim 14
where the second converter is an N-bit digital to analog converter, where N is an integer; and
where the second converter generates $2^N$ plus the at least one additional level on an output of the second converter.

21. A system to transmit digital data segments coded to indicate one of $2^N$ voltage levels, where N is an integer greater than or equal to 2, on an analog channel comprising:
a level encoder to assign a code to each data segment, the code corresponding to one of $2^N$ plus at least one additional voltage level, where N is the number of bits in each data segment; and
a digital-to-analog converter to convert the codes into such voltage levels.

22. The system of claim 21 comprising:
an analog-to-digital converter to receive the voltage levels after transmission via the analog channel and to convert them into their respective codes; and
a level decoder to convert the codes back to their corresponding data segments.

23. The system of claim 22 where the codes minimize data skew.

24. The system of claim 21 where the level encoder comprises:
a serial to parallel converter to convert serial data segments into parallel data segments;
an input latch to latch the parallel data segments;
a coding block to code the parallel data segments with the code;
an output latch to latch the coded parallel data segments; and
a parallel to serial converter to convert the coded parallel data segments to coded serial data segments.

25. The system of claim 21 where the digital-to-analog converter includes:
a pre-driver to receive the coded serial data segments; and
a multi-level driver to generate the voltage levels responsive to the pre-driver.

26. A system comprising:
a level encoder having an input to receive data segments coded using a first code levels and an output to supply second data codes one of $2^N$ plus at least one additional voltage level to which each data segment is assigned, where N is an integer, the level encoder including:
  a serial to parallel converter to convert serial data segments in the first code into parallel data segments in the first code;
  an input latch to latch the parallel data segments in the first code;
  a coding block to code the parallel data segments in the first code to parallel data segments in the second code;
  an output latch to latch the parallel data segments in the second code; and
  a parallel to serial converter to convert the parallel data segments in the second code to serial data segments in the second code; and
a converter to convert the second data codes into such voltage levels: and
a controller output to supply the voltage levels.

27. A system comprising:
a level encoder having an input to receive data segments coded using a first code levels and an output to supply second data codes one of $2^N$ plus at least one additional voltage level to which each data segment is assigned, where N is an integer;
a converter to convert the second data codes into such voltage levels, the converter including:
  a pre-driver to receive the data segments in the second code; and
  a multi-level driver to generate the voltage levels responsive to the pre-driver; and
a controller output to supply the voltage levels.

28. A system to transmit digital data segments on an analog channel comprising:
a level encoder to assign a code to each data segment, the code corresponding to one of $2^N$ plus at least one additional voltage level, where N is the number of bits in each data segment, the level encoder comprising:
  a serial to parallel converter to convert serial data segments into parallel data segments;
  an input latch to latch the parallel data segments;
  a coding block to code the parallel data segments with the code;
  an output latch to latch the coded parallel data segments; and
  a parallel to serial converter to convert the coded parallel data segments to coded serial data segments; and
a digital-to-analog converter to convert the codes into such voltage levels.

29. A system to transmit digital data segments on an analog channel comprising:
a level encoder to assign a code to each data segment, the code corresponding to one of $2^N$ plus at least one additional voltage level, where N is the number of bits in each data segment; and
a digital-to-analog converter to convert the codes into such voltage levels, the digital-to-analog converter comprising:
  a pre-driver to receive the coded serial data segments; and
  a multi-level driver to generate the voltage levels responsive to the pre-driver.

* * * * *

UNITED STATES PATENT AND TRADEMARK OFFICE
CERTIFICATE OF CORRECTION

| | | |
|---|---|---|
| PATENT NO. | : 7,355,532 B2 | Page 1 of 1 |
| APPLICATION NO. | : 11/066831 | |
| DATED | : April 8, 2008 | |
| INVENTOR(S) | : Jin-Hyun Kim | |

It is certified that error appears in the above-identified patent and that said Letters Patent is hereby corrected as shown below:

Column 8, line 41, the word "VI" should read -- V1 --.

Signed and Sealed this

Fifth Day of August, 2008

JON W. DUDAS
*Director of the United States Patent and Trademark Office*